United States Patent
Hu et al.

(10) Patent No.: US 10,459,743 B2
(45) Date of Patent: Oct. 29, 2019

(54) NETWORK ISOLATION IN VIRTUAL DESKTOP INFRASTRUCTURE

(71) Applicant: VMware, Inc., Palo Alto, CA (US)

(72) Inventors: Jinxing Hu, Beijing (CN); Lu Liu, Beijing (CN); Yuping Wei, Beijing (CN); Lina Li, Beijing (CN)

(73) Assignee: VMware, Inc., Palo Alto, CA (US)

( * ) Notice: Subject to any disclaimer, the term of this patent is extended or adjusted under 35 U.S.C. 154(b) by 161 days.

(21) Appl. No.: 15/807,951

(22) Filed: Nov. 9, 2017

(65) Prior Publication Data

US 2019/0138324 A1 May 9, 2019

(51) Int. Cl.
*G06F 9/455* (2018.01)
*G06F 9/451* (2018.01)
*G06F 9/54* (2006.01)

(52) U.S. Cl.
CPC .......... *G06F 9/452* (2018.02); *G06F 9/45558* (2013.01); *G06F 9/547* (2013.01); *G06F 2009/45595* (2013.01)

(58) Field of Classification Search
CPC ...... G06F 9/452; G06F 9/45558; G06F 9/547; G06F 2009/45595
See application file for complete search history.

(56) References Cited

U.S. PATENT DOCUMENTS

2013/0191630 A1* 7/2013 Ylonen ............... H04L 63/1483 713/153
2014/0101554 A1* 4/2014 Morris .................. H04L 67/36 715/733

* cited by examiner

*Primary Examiner* — Adam Lee
(74) *Attorney, Agent, or Firm* — Patterson + Sheridan, LLP (57) ABSTRACT

Disclosed are methods and apparatus for isolating a connection between a client machine and a remote desktop application running on a virtual machine (VM), the remote desktop application providing a virtual desktop to the client machine. The VM is configured to execute the remote desktop application and one or more other applications. The connection between the client machine and the remote desktop application, for exchanging remote desktop protocol data, is provided by using a first virtual network interface card (VNIC) on the VM, where the first VNIC is exclusively accessible by the remote desktop application and inaccessible to the one or more other applications. Another connection between a remote server and one of the one or more other applications is provided using a second VNIC on the VM, in response to the remote desktop application receiving an indication from the virtual desktop to execute the one application.

20 Claims, 5 Drawing Sheets

NETWORK ISOLATION IN VIRTUAL DESKTOP INFRASTRUCTURE

BACKGROUND

Server-based computing allows a networked client device, remotely situated with respect to a server computing system, to access computing resources on the server. For example, the client device may run desktop client software and hardware that uses a remote desktop protocol, such as Remote Desktop Protocol (RDP), Virtual Network Computing (VNC), or Personal Computer over Internet Protocol (PCoIP), to access a desktop remotely. The desktop client software displays an image of a graphical user interface (GUI) generated by the operating system and applications running at the server computing system. For example, a virtual machine running on the server computer system transmits to the networked client device a continuous flow of GUI images generated by an operating system running on the virtual machine, and applications running on the operating system. The virtual machine employs a remote desktop protocol and a virtual network interface card (VNIC) to communicate with the client device. Using the same VNIC, the virtual machine also allows applications running in the user space of the operating system to interact with other network destinations. However, allowing all applications running in the user space of the virtual machine's operating system to operate and access the same VNIC makes the system vulnerable to misuse.

SUMMARY

One or more embodiments of the present invention provide a method for isolating a connection between a client machine and a remote desktop application. The method includes providing the connection between the client machine and the remote desktop application to exchange remote desktop protocol data by using a first virtual network interface card (VNIC) on a virtual machine (VM), wherein the VM is configured to execute the remote desktop application and one or more other applications, the remote desktop application providing a virtual desktop to the client machine, and wherein the first VNIC is exclusively accessible by the remote desktop application and inaccessible to the one or more other applications. The method also includes providing another connection between a remote server and one of the one or more other applications using a second VNIC on the VM, in response to the remote desktop application receiving an indication from the virtual desktop to execute the one application.

Also described herein are embodiments of a non-transitory computer readable medium comprising instructions to be executed in a computer system, wherein the instructions when executed in the computer system perform the method described above for isolating a connection between a client machine and a remote desktop application.

Also described herein are embodiments of a computer system, wherein software for the computer system is programmed to execute the method described above for isolating a connection between a client machine and a remote desktop application.

DETAILED DESCRIPTION

Embodiments of the invention provide a technique and system for providing communications between a client machine and first and second applications. In some embodiments, the method is used by a virtual machine that is configured with two separate VNICs, one of which is exclusively accessible and operable by a remote desktop application (i.e., first application), through a network protocol stack implemented in the user space of the virtual machine's guest operating system, for communication with one or more components of the VDI system. In such embodiments, the other VNIC is configured and accessible by other applications running the user space, through a network protocol stack implemented in the kernel space of the virtual machine's guest operating system.

Figure 1:
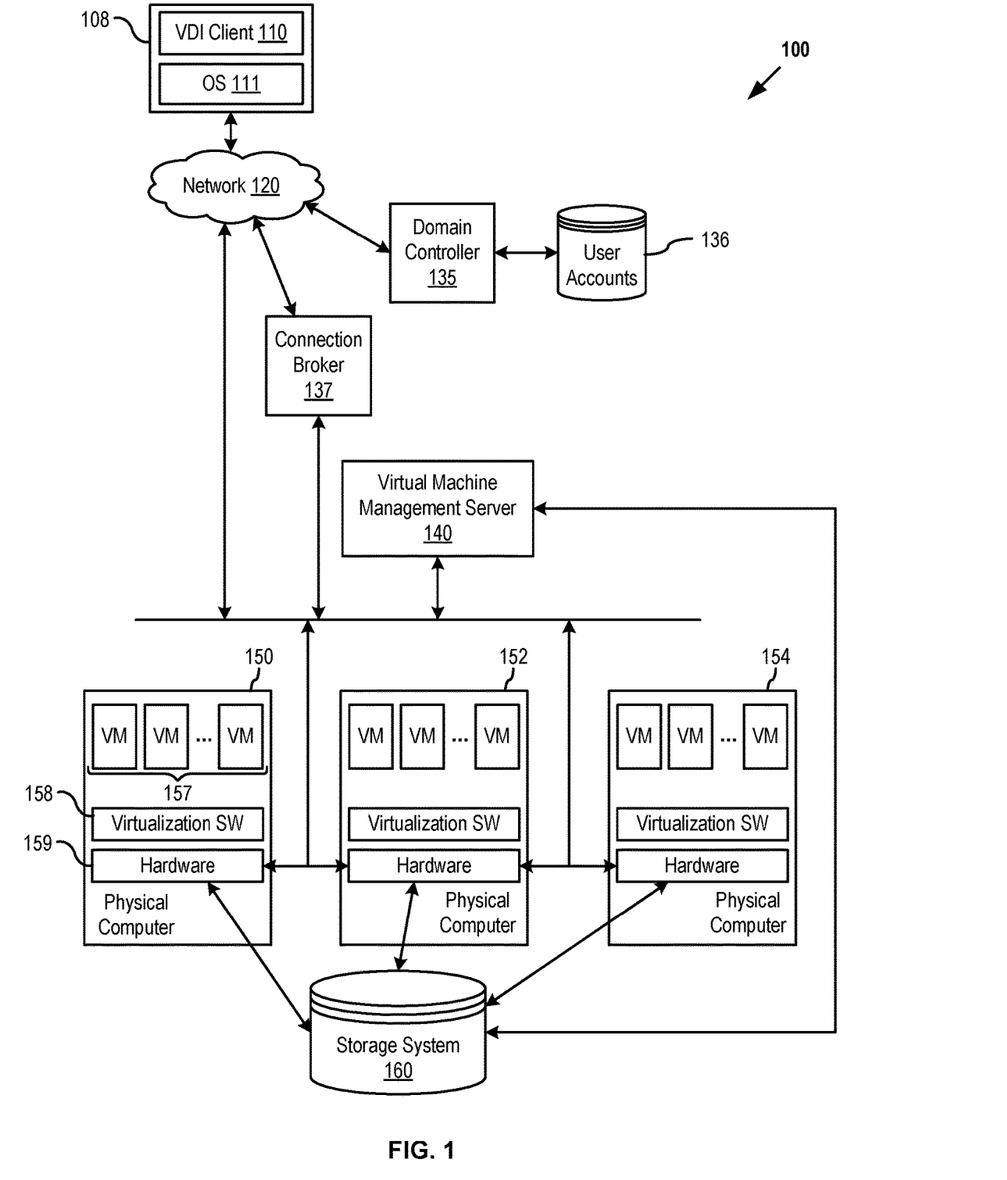
FIG. 1 illustrates components of a virtual desktop infrastructure (VDI) system in which one or more embodiments of the present invention may be implemented.

FIG. 1 illustrates components of a VDI system 100 in which one or more embodiments of the present invention may be implemented. In VDI system 100, VDI client software programs (also referred to as "VDI clients" for short), e.g., VDI client 110, run on operating systems of local computing devices. For example, FIG. 1 shows VDI client 110 running on operating system (OS) 111 that is itself running on top of client machine 108. VDI clients provide an interface for users to access their associated desktops, which run in virtual machines 157 in a data center that is remote from the users' locations. The term "desktop" may refer to the instance of an interactive operating environment provided by a computer operating system along with one or more software applications, typically in the form of a display and sound output and keyboard and mouse input, through which users can launch, interact with, and manage applications, settings, and data. The term "desktop" may also refer to a virtual machine or physical system accessed by an end user as a local (to the user) desktop or workstation computer. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others. In some embodiments, the desktops are accessed through a web browser running on a commodity operating system backed by a general purpose computer even with no access to any VDI client software program.

VDI system 100 may include a domain controller 135, such as Microsoft® Active Directory®, that manages user accounts 136 including user log-in information, and a connection broker 137 that manages connections between VDI clients, or a web browser running on client machine 108, and desktops running in virtual machines 157 or other platforms. Domain controller 135 and connection broker 137 may run on separate servers or in separate virtual machines running on the same server or different servers. In the embodiments of the present invention illustrated herein, desktops that are running in virtual machines 157 are instantiated on a plurality of physical computers 150, 152, 154, each of which includes virtualization software (SW) 158 and hardware 159. Physical computers 150, 152, 154 may be controlled by a virtual machine management server 140, and be coupled to a shared persistent storage system 160.

All of the components of VDI system 100 communicate via network 120. For simplicity, a single network is shown but it should be recognized that, in actual implementations, the components of VDI system 100 may be connected over the same network or different networks. Furthermore, though a particular configuration of the virtualized desktop infrastructure is described above and illustrated in FIG. 1, it should be recognized that one or more embodiments of the present invention may be practiced with other configurations of the virtualized desktop infrastructure.

Figure 2:
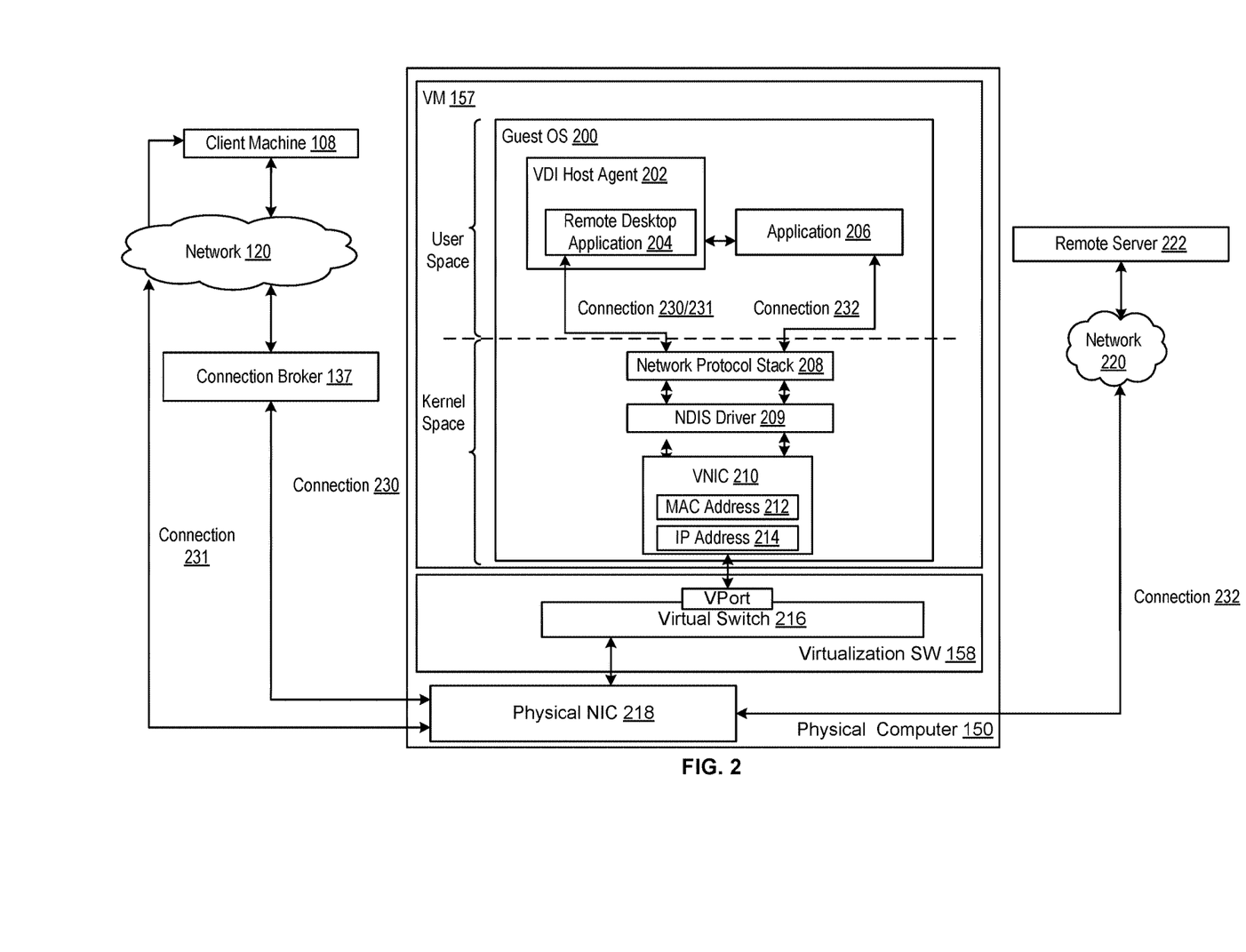
FIG. 2 illustrates in greater detail an example virtual machine of the VDI system in FIG. 1, according to one embodiment of the present invention.

FIG. 2 illustrates in greater detail a VM 157 and its components, which enable VM 157 to run a remote desktop application that can be accessed remotely by client machine 108. VM 157 is a virtual computing instance backed by physical resources (e.g., hardware 159) of an underlying physical computer (e.g., physical computer 150) that enable VM 157 to run a guest operating system (OS) 200. As shown in FIG. 2, guest OS 200 includes a user space and a kernel space. Residing in the user space of guest OS 200 are VDI host agent 202 and application 206. VDI host agent 202 runs in the user space of the guest OS 200 to manage and configure VM 157 to be able to communicate with client machine 108 directly or through connection broker 137. VDI host agent 202 provides VM 157 with a remote desktop application 204 that allows client machine 108 to access a remote desktop running on VM 157 through a remote display protocol such as RDP, VNC, PCoIP, Blast Extreme, etc. For example, in some embodiments, remote desktop application 204 includes a collection of PCoIP Server files, as well as other files, that allow a user of client machine 108 to connect to their associated desktop, running on guest OS 200 of VM 157, through the PCoIP display protocol. As described above, remote desktop application 204 transmits images of the desktop (e.g., a graphical user interface generated by guest OS 200 and applications running on VM 157) to client machine 108 for display to a user.

As shown in FIG. 2, in addition to VDI host agent 202, guest OS 200 runs a application 206. Application 206, in some embodiments, is the client side of a client-server software application in which remote server 222 is the server side. In some embodiments, application 206 is a desktop application. For example, in some embodiments, application 206 is a web browser, such as the Chrome browser, that transmits, for example, Hypertext Transfer Protocol (HTTP) requests to remote server 222, which may be a web server. In such embodiments, remote server 222 accepts and fulfills requests received from application 206 by sending back HTTP responses that may include, for example, HTML pages, files, images, video, etc. When application 206 is running in the user space of guest OS 200, images of the desktop are transmitted to client machine 108 and include the user interface generated by application 206. As an example, a user accessing a desktop running on VM 157 uses the user interface to launch a web browser on the desktop and use the web browser to visit one or more web sites through a connection between the web browser and various web servers (e.g., remote server 222) that serve those specific websites.

VM 157 also includes network protocol stack 208, network driver interface specification (NDIS) driver 209, as well as virtual network interface card or controller (VNIC) 210, all running in the kernel space of guest OS 200, which collectively enable applications running in the user space to communicate and exchange data with network destinations such as connection broker 137, client machine 108, and remote server 222. Network protocol stack 208 is a software implementation of a group of interoperable communication protocol layers that provide networking capabilities. In some embodiments, network protocol stack 208 comprises the transmission control protocol or user datagram protocol/Internet protocol (TCP-UDP/IP), which defines communications over various types of networks, including the Internet, and includes the five protocol layers of application, transport, network, data link and physical. In some other embodiments, the network protocol stack 208 comports with the open system interconnect (OSI) protocol layers of application, presentation, session, transport, network, data link, and physical. The embodiments described herein are discussed with reference to the TCP-UDP/IP model.

In order to use network protocol stack 208, applications or processes running in the user space of guest OS 200 may use a socket application programming interface (API). When the connection is established, the applications (e.g., VDI host agent 202, application 206) running in the user space are able to exchange data via network protocol stack 208. For example, application 206 may execute a process that communicates data to a certain network destination, such as remote server 222 using the network protocol stack 208 for encapsulation and transmission.

During encapsulation, each protocol layer of network protocol stack 208 builds a protocol data unit (PDU) by adding a header (and in some cases a trailer), containing control information, to the PDU from the layer above. As an example, when network protocol stack 208 comports with the TCP/IP protocols, data that is communicated to network protocol stack 208 is encapsulated by the protocol layers with an HTTP header, a TCP/UDP header, an IP header, and finally an Ethernet or frame header/trailer. An IP header appended to the data includes the source IP address of VM 157 (e.g., IP address 214, as described below) as well as the destination IP address of a network destination (e.g., remote server 222). The Ethernet header also includes a source MAC address of VM 157 (e.g., MAC address 212) and a destination MAC address of, for example, the next hop (e.g., a router) in the network.

When the encapsulation is complete, the resulting data packet or frame is then passed to NDIS driver 209 that resides in the kernel space of guest OS 200. NDIS driver 209 provides an API which the network protocol stack 208 uses to communicate with VNIC 210. VNIC 210 is responsible for transferring data frames or packets between VM 157 and an underlying virtualization software (SW) 158. VNIC 210 communicates with virtualization SW 158 through a virtual port (vport) provided by virtual switch 216 (e.g., which may further encapsulate the data packet using a Virtual Extensible Local Area Network (VXLAN) tunnel endpoint (VTEP) in cases where the network destination is another virtual machine on another host within a virtualized network). Virtual switch 216 is implemented in virtualization SW 158 and is connected to physical NIC 218 of the host or underlying physical computer 150. In some embodiments, VNIC 210 is a virtualization of physical NIC 218 of physical computer 150, and allows network traffic to be transferred between virtual machines 157 executing on physical computer 150 and other network destinations (e.g., client machine 108, remote server 222).

Once physical NIC 218 receives a data packet or frame, it transmits the data packet either to the ultimate network destination, if the VM generating the data packet is part of the same logical Layer-2 network, or a next hop in the network, such as a router, that is able to eventually route the data packet to its ultimate destination. As an example, in some embodiments, data (e.g., HTTP request) is generated by application 206 for transmission to remote server 222. In such embodiments, the destination IP address indicated in the IP header of the data packet generated by network protocol stack 208 is the IP address of remote server 222. As a result, once the data packet arrives at physical NIC 218, it is transmitted to a router which then routes the data packet to remote server 222 through network 220. In some embodiments, network 220 is a wide area network (WAN) or the network of networks (the Internet). The connection between application 206 and remote server 222 is illustrated as connection 232.

In another example, VM 157 transfers VDI data to and receives data from client machine 108 using a remote desktop protocol such as RDP, VNC, PCoIP, etc. As described above, VDI host agent 202 is configured to transmit VDI data, comprising display and input data, to client machine 108, according to conventional remote desktop techniques. The VDI data may include a base graphical user interface (GUI) image that is used to display the GUI of a remote desktop, running on VM 157, at client machine 108. For example, in some embodiments, the base GUI image is a graphical bitmap or frame buffer illustrating a portion of or an entirety of the display of the remote desktop, similar to a screenshot of the remote desktop. In other embodiments, the base GUI image is graphical information for drawings lines, polygons, and other shapes, fonts, and graphical primitives for rendering an image that displays the GUI of the remote desktop at client machine 108.

Once VDI data is generated according to one of the remote desktop protocols (e.g., PCoIP, it is then passed to network protocol stack 208, where the VDI data is encapsulated with a TCP/UDP header, an IP header, and a frame header and trailer, as described above in relation to the encapsulation of data. After a data packet that includes VDI data arrives at physical NIC 218, it is either transmitted directly to client machine 108 or it is first transmitted to connection broker 137. For example, in some embodiments, VM 157 and client machine 108 have a broker-less connection, in which case the VDI data is transmitted to client machine 108, through network 120, without having to go through connection broker 137, where, in some embodiments, network 120 is a local area network (LAN), WAN, or the Internet. A broker-less connection between client machine 108 and VM 157 is shown in FIG. 2 as connection 231. In some other embodiments, client machine 108 and VM 157 communicate through connection broker 137. In such embodiments, for example, client machine 108 establishes a connection with connection broker 137 and requests access to a remote desktop that client machine 108 is entitled to use. In response, connection broker 137 authenticates client machine 108 and provides the client with access to the remote desktop running on, for example, VM 157. When the connection between client machine 108 and VM 157 is brokered through connection broker 137, a data packet (e.g., including VDI data) arriving at physical NIC 218 is transmitted to connection broker 137, which then forwards the packet to client machine 108. A connection established between client machine 108 and VM 157 through connection broker 137 is illustrated in FIG. 2 as connection 230.

In addition, in some embodiments, if client machine 108 and/or connection broker 137 are part of the same logical Layer-2 network with VM 157, physical NIC 218 transmits a data packet, which includes VDI data, to client machine 108 and/or connection broker 137, without the use of a router. In some other embodiments, if client machine 108 and/or connection broker 137 are not part of the same logical Layer-2 network with VM 157, physical NIC 218 transmits the data packet to a router to route the data packet to connection broker 137 and/or client machine 108.

Accordingly, FIG. 2 illustrates two different types of connections established between VM 157 and other network destination. The first type of connection is called a management network connection and the second type of connection is called a product network connection. The management network connection is one established between a VDI system component and VM 157, such as between VM 157 and connection broker 137. For example, VDI host agent 202 may communicate with connection broker 137 for performing tasks relating to authentication and session management. Another example is a connection between VM 157 and client machine 108. The product network connection is one established between VM 157 and a non-VDI system component, such as a remote server (e.g., remote server 222).

As shown in FIG. 2, because network protocol stack 208 is implemented in the kernel space of guest OS 200, applications running as separate processes in the user space of guest OS 200 (e.g., remote desktop application 204 and application 206) have access to VNIC 210 and its IP address 214 through the socket API provided by guest OS 200. That is, the kernel space of the OS is made in charge of managing any VNICs associated with the network protocol stack and thus all applications running as separate processes in the user space are able to operate the VNICs and access their IP addresses through the operating system's socket API. This is illustrated in FIG. 2, where all connections established between the applications running in the user space (e.g., connections 230, 231, and 232) and one or more network destinations (e.g., client machine 108 and remote server 222) utilize the same network protocol stack 208 and VNIC 210.

However, in cases, where a VM (e.g., VM 157) is being used as a remote VDI desktop, as is the case in the embodiments described herein, allowing all applications running in the user space to operate the same VNIC and to have access to its IP address makes the VM vulnerable to misuse. For example, in the embodiments of FIG. 2, a user of client machine 108 that connects to a remote desktop running on VM 157 is allowed access to connection broker 137 or other components of VDI system 100 through VNIC 210, whose IP address is visible to the user. Thus, in cases where there are vulnerabilities in the components of VDI system 100 and their operating systems, the user is able to take advantage of such vulnerabilities. For example, there may be vulnerabilities in guest OS 200 or connection broker 137 that a user of client machine 108 may take advantage of (e.g., by installing malware on guest OS 200) in order to, for example, access sensitive data stored at connection broker 137.

Accordingly, certain embodiments described herein relate to isolating the management network connections from the product network connections by configuring and implementing a second network protocol stack and a second VNIC. The second protocol stack is configured to reside in the user space (lower privilege space) of the guest OS 200 and the second VNIC is configured to reside in the kernel space (higher privilege space) of guest operating system 200. The second network protocol stack and the second VNIC are exclusively controlled and operated by remote desktop application 204. That is, the remote desktop application has access to network protocol stack 308, but other applications, such as application 206, do not.

Figure 3:
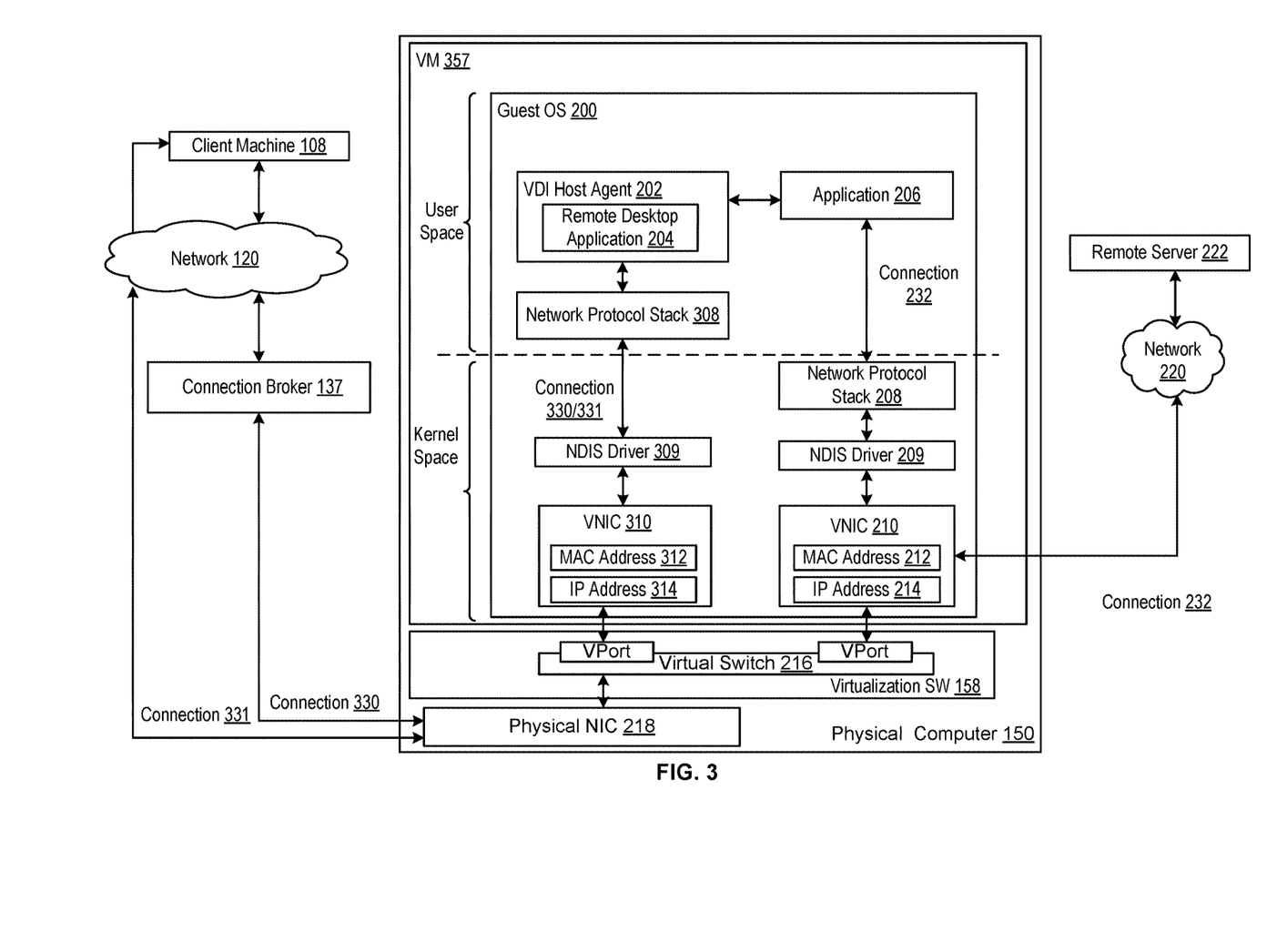
FIG. 3 illustrates a virtual machine configured to enable isolation of network connections used by different components of the virtual machine, according to one embodiment of the present invention.

FIG. 3 shows an embodiment in which management network connections (e.g., connections 330-331) are isolated from the product network connections (e.g., connection 232), by configuring guest OS 200 of VM 357 with two VNICs 310 and 210 in the kernel space and two network protocol stacks 208, 308. Each one of VNICs 210 and 310 communicates with its own vport on virtual switch 216, which is coupled to physical NIC 218. Network protocol stack 208 resides in the kernel space of guest OS 200 and network protocol stack 308 resides in user space of guest OS 200 and in the same process space as the remote desktop application. VDI Host Agent 202 and Remote Desktop Application 204 have access to network protocol stack 308, while application 206, being a different process, has access to network protocol stack 208, but not network protocol stack 308.

As described above in relation to FIG. 2, when a network protocol stack associated with a VNIC is implemented in the kernel space of the VM's guest OS, all applications running in the user space of the guest OS are able to operate the VNIC and access its corresponding IP address through the operating system's socket API. However, as shown in FIG. 3, by implementing a separate network protocol stack 308 in the user space of guest OS 200 and thereby enabling remote desktop application 204 to exclusively access and operate VNIC 310, the management network connections (i.e., connections 330-331 between client machine 108 and VM 157) are isolated from the product network connections (i.e., connection 232 between remote server 222 and VM 157). Consequently, only remote desktop application 204 has access to and is aware of IP address 314 that is assigned to VNIC 310, which enables remote desktop application 204 to communicate with other components in VDI system 100 using this private IP address 314. However, application 206 is not able to access VNIC 310 or become aware of its IP address, because VNIC 310 is not managed by a network protocol stack in the kernel space of guest OS 200. In addition, implementing network protocol stack 308 in the user space of guest OS 200 provides an extra layer of security and reliability as the kernel is able to trap and appropriately respond to any unauthorized function calls or instructions received from network protocol stack 308.

Figure 4:
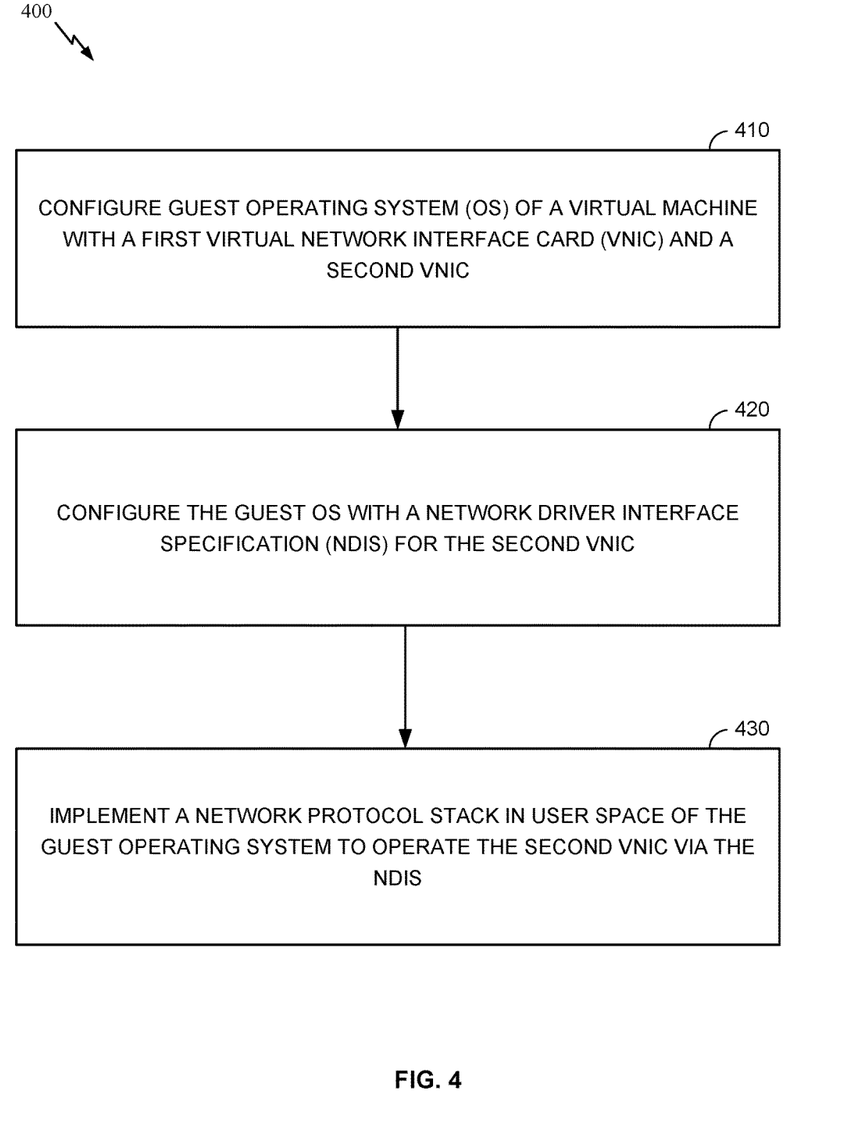
FIG. 4 illustrates a flow diagram for configuring a virtual machine and its guest operating system, according to one embodiment of the present invention.

FIG. 4 illustrates example operations carried out to configure a VM and its guest operating system, as shown in FIG. 3. In some embodiments, example operations 400 of FIG. 4 are carried out by an administrator through a management platform provided by virtualization SW 158. Example operations 400 of FIG. 4 are described herein by reference to FIG. 3.

At step 410, an administrator configures guest OS 200 of VM 357 with a first VNIC and a second VNIC. In one example, the administrator configures the guest operating system of the VM with two VNICS when creating the VM. In another example, an existing VM (e.g., VM 157) may be configured with a single VNIC (VNIC 210), in which case the administrator then edits VM 157 to add a second VNIC, e.g., VNIC 310, to the kernel space of guest OS 200, as shown in FIG. 3, resulting in VM 357. When a VNIC is created or added, a new exclusive MAC address (e.g., MAC address 312) is assigned to the VNIC, such that each MAC address corresponds only to a single VNIC implemented in the VM (i.e., MAC address 212 is different from MAC address 312).

At step 420, the administrator configures the guest OS 200 with a NDIS for the second VNIC. As shown in FIG. 3, NDIS driver 309 is installed in the kernel space of guest OS 200. As described above, NDIS is a standard that defines the communication between a network adapter (e.g., VNIC 310) and the network protocol stack (e.g., network protocol stack 308). NDIS provides a standard library of functions, referred to as a wrapper, which acts as an abstraction layer allowing network protocol stack 308 to transfer data packets to and from network destinations without being concerned about the type of network adapter or the underlying operating system.

At step 430, the administrator implements a network protocol stack in user space of guest OS 200 to operate the second VNIC via the NDIS, after configuring NDIS driver 309. Network protocol stack 308, in some embodiments, is implemented by installing or generating a private protocol stack library that includes protocols such as TCP/IP, UDP, DNS, etc. Through the private protocol stack library, network protocol stack 308 also provides an API (e.g., similar to a socket API) for interfacing with remote desktop application 204. The API enables remote desktop application 204 (e.g., PCoIP server) to establish network protocol (e.g., TCP/UDP/IP) connections and exchange data. Network protocol stack 308 is able to operate VNIC 310 via NDIS driver 309 by, for example, using or calling one or more hardware configuration and operation functions provided by the standard library of NDIS.

After implementing VNIC 310, NDIS driver 309 and network protocol stack 308 in VM 357, remote desktop application 204 is enabled to call the API that interfaces with network protocol stack 308 to initiate a certain network communications protocol, such as TCP/IP. In some embodiments, as described above, remote desktop application 204 comprises files such as PCoIP server files, among others. In some embodiments, remote desktop application 204 comprises Blast Extreme server files, among others. After initiating, for example, the TCP/IP protocol, remote desktop application 204 then calls the API, interfacing with network protocol stack 308, to acquire a valid IP address (e.g., IP address 314) that can be assigned to VNIC 310. Acquiring a valid IP address may be performed through protocols such as the dynamic host configuration protocol (DHCP) or the domain name system (DNS) protocol. IP address 314 is an exclusive IP address, which is different from IP address 214, and may be an address in an IPv4 or IPv6 packet. Also, IP address 314 may be static or non-static IP address. Subsequently, remote desktop application 204 calls the API, interfacing with network protocol stack 308, to establish TCP/UDP connections with VNIC 310 using the TCP/UDP/IP protocols.

As described above, by implementing a separate network protocol stack 308 in the user space of guest OS 200 and thereby enabling remote desktop application 204 to exclusively access and operate VNIC 310, the management network connections (e.g., connections 330-331 between client machine 108 and VM 157) are isolated from the product network connections (i.e., connection 232 between remote server 222 and VM 157). As a result of this, VNIC 310 is inaccessible and not known to application 206. Only remote desktop application 204 is able to access VNIC 310 and private IP address 314, which remote desktop application 204 can use to communicate with other components in VDI system 100.

Figure 5:
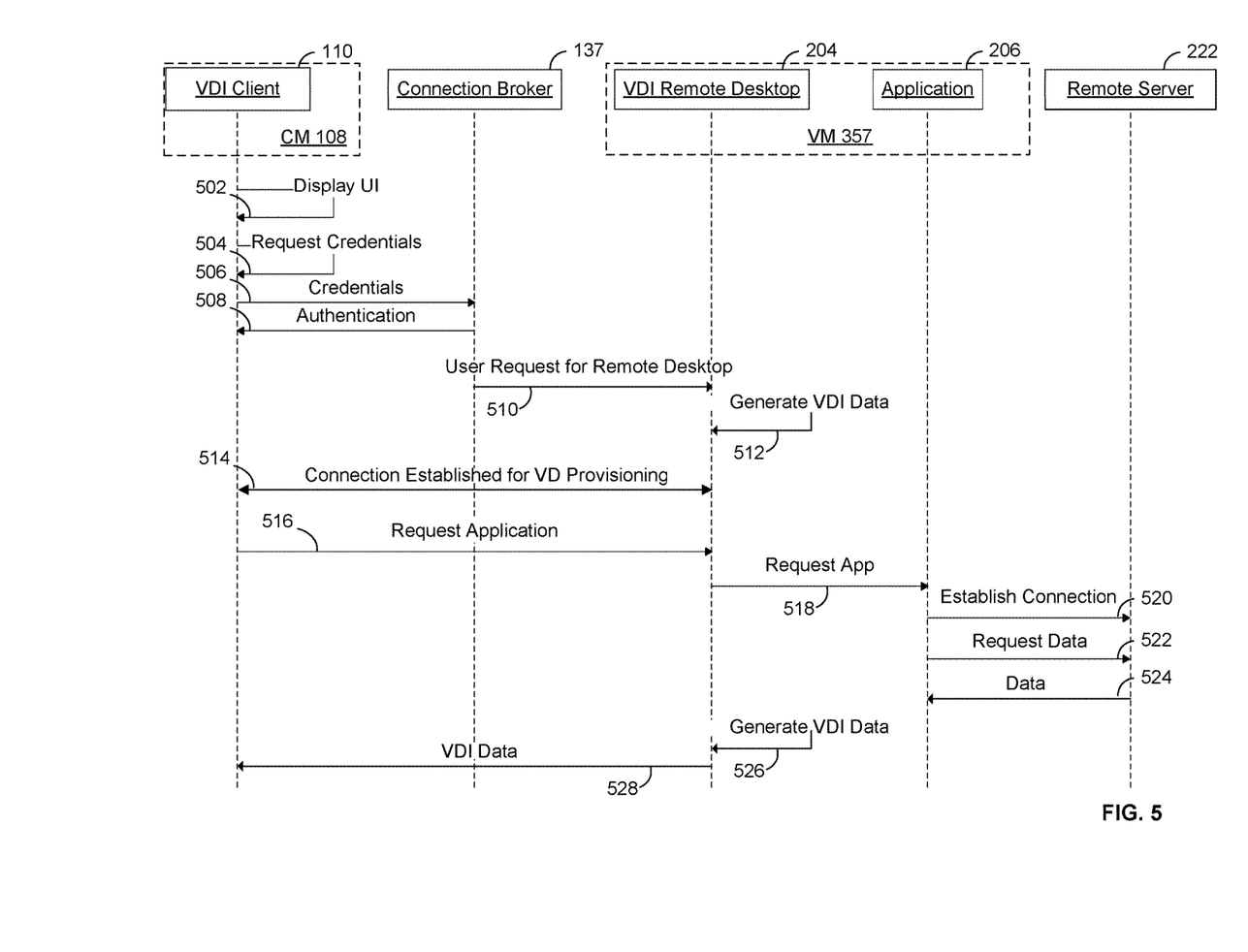
FIG. 5 illustrates a sequence diagram for the virtual machine of FIG. 4 to establish a private connection with a client machine and a separate connection with a remote server.

FIG. 5 illustrates example operations 500 for provisioning a client device with a remote or virtual desktop being hosted on a virtual machine, e.g., VM 357. Operations 400 are described herein with reference to FIG. 3.

The operations begin at step 502, when, for example, a user first launches VDI client 110 on client machine (CM) 108, which results in a user interface being displayed on client machine 108. At step 504, in some embodiments, the user interface asks the user for credentials in order to enable the user to access a remote desktop running on VM 357. The user then inputs the requested credentials as well as other information that may be required for verifying the user and/or client machine 108.

After the user inputs his/her user credentials, client machine 108 transmits, at step 506, those user credentials to connection broker 137. In response, at step 508, connection broker 137 authenticates the user and identifies a remote desktop application that the user is entitled to access. As an example, connection broker 137 determines that the user is entitled to access remote desktop application 204 running on VM 357. In some embodiments, connection broker 137 is configured with information indicating that the IP address for use by components in VDI system 100 to connect with VM 357 is IP address 314. As a result, after authenticating the user and identifying the user's desktop, as well as VM 357 hosting the desktop, at step 510, connection broker 137 transmits the user's request for access to the desktop to VM 157, using IP address 314 as the destination IP address.

Although FIG. 5 illustrates the connection (e.g., connection 330, as shown in FIG. 3) between VM 357 and VDI client 110 being brokered by connection broker 137, as described above, in some embodiments, VDI client 110 may communicate with VM 357 directly (i.e., connection 331). As an example, if VM 357 is running and VDI client 110 is aware of IP address 314, VDI client 110 may be able to directly access VM 357 by, for example, using standard tools such as Windows Terminal Services.

As described above in relation to FIGS. 3 and 4, VNIC 310, with IP address 314, is configured for the exclusive use of remote desktop application 204 to communicate with other VDI components in VDI system 100. Accordingly, any data packets, including information relating to the user request, received at physical NIC 218, with destination IP address 314, is transmitted to VNIC 310 and subsequently processed by network protocol stack 308 for use by remote desktop application 204.

After receiving the user request, at step 512, remote desktop application 204 generates VDI data for provisioning VDI client 110. As described above, the VDI data may include a base GUI image that is used to display the GUI of the remote desktop, running on VM 357. The generated VDI data, as described in relation to FIG. 3, is then processed by network protocol stack 308. For example, the VDI data is encapsulated with a source IP address 314 and a destination IP address of client machine 108. After encapsulation by network protocol stack 308, the VDI data is then passed to VNIC 310 through NDIS driver 309 and further passed to physical NIC 218. At step 514, the VDI data is subsequently transmitted by physical NIC 218 to client machine 108. By transmitting VDI data to client machine 108, VM 157 has, in effect, established a connection with VDI client 110 and has provisioned a remote desktop for client machine 108. As a result, VDI client 110 is able to display the GUI of a remote desktop to a user within a virtual desktop console.

With access to the remote desktop running on VM 157 established, in some embodiments, the user may wish to use application 206, which is accessible to the user through remote desktop application 204. For example, the user may open application 206, which may be a web browser, and request to visit a certain website. As a result, at step 516, a request (an indication in the form of input) to run application 206 is sent by VDI client 110 to VDI remote desktop 204. At step 518, the request is then communicated by VDI remote desktop application 204 to application 206 residing in the user space of guest OS 200 running on VM 357.

In response, at step 520, application 206 establishes a connection with remote server 222, which aids application 206 in obtaining the requested data (e.g., web content). However, unlike connections 330 and 331, connection 232, that is established between application 206 and remote server 222, uses IP address 214 of VNIC 210. This is because, IP address 214 is the only IP address made available to any applications, including application 206, running in the user space, except for VDI host agent 202 that runs remote desktop application 204. As described above, application 206 may be any type of user application and remote server 222 may be any type of server aiding application 206.

After a connection between application 206 and remote server 222 is established, at step 520, a request for data in step 522 is sent by application 206 to remote server 222. In response, at step 524, remote server 222 transmits the requested data to application 206. For example, in the example described above where application 206 is a web browser, the data may include web content corresponding to a certain website that has been requested by a user of client machine 108. At step 526, remote desktop application 204 generates VDI data including images of application 206 running using the data received from application 222. Subsequently, at step 528, remote desktop application 204 transmits the generated VDI data to VDI client 110, which displays the data to the user of client machine 108. Accordingly, VM 357, configured as illustrated in FIGS. 3 and 4, enables the isolation of the management network connections (e.g., connections 330-331 between client machine 108 and VM 157) from the product network connections (e.g., connection 232 between remote server 222 and VM 157). More specifically, as described above, implementing a separate network protocol stack (e.g., network protocol stack 308) in the user space, that is exclusively operable and accessible by the remote desktop application (e.g., remote desktop application 204), prevents a client machine user who is accessing applications (e.g., application 206) running in the user space from gaining access to the VNIC (e.g., VNIC 310) and IP address (e.g., IP address 314), associated with the network protocol stack in the kernel space. As such, when there are vulnerabilities in the system, the client machine user is isolated to accessing the one or more components in the VDI system and cannot take advantage of such vulnerabilities.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for isolating a connection between a client machine and a remote desktop application, the method comprising:
providing the connection between the client machine and the remote desktop application to exchange remote desktop protocol data by using a first virtual network interface card (VNIC) on a virtual machine (VM),
wherein the VM is configured to execute the remote desktop application and one or more other applications, the remote desktop application providing a virtual desktop to the client machine, and
wherein the first VNIC is exclusively accessible by the remote desktop application and inaccessible to the one or more other applications; and
providing another connection between a remote server and one of the one or more other applications using a second VNIC on the VM, in response to the remote desktop application receiving an indication from the virtual desktop to execute the one application.

2. The method of claim 1, wherein the first VNIC operates in a kernel space of a guest operating system of the VM.

3. The method of claim 2, wherein the first VNIC is associated with a first network protocol stack in a user space of the guest operating system making the first VNIC being inaccessible to the one or more other applications.

4. The method of claim 3, wherein the first network protocol stack is inaccessible to the one or more other applications.

5. The method of claim 1, wherein the second VNIC operates in a kernel space of a guest operating system of the VM.

6. The method of claim 5, wherein the second VNIC is associated with a second network protocol stack operating in the kernel space of the guest operating system.

7. The method of claim 1, wherein the connection between the client machine and the remote desktop application is brokered by a connection broker.

8. A non-transitory computer readable medium comprising instructions to be executed in a computer system, wherein the instructions when executed in the computer system perform a method for isolating a connection between a client machine and a remote desktop application, the method comprising:
providing the connection between the client machine and the remote desktop application to exchange remote desktop protocol data by using a first virtual network interface card (VNIC) on a virtual machine (VM),
wherein the VM is configured to execute the remote desktop application and one or more other applications, the remote desktop application providing a virtual desktop to the client machine, and wherein the first VNIC is exclusively accessible by the remote desktop application and inaccessible to the one or more other applications; and
providing another connection between a remote server and one of the one or more other applications using a second VNIC on the VM, in response to the remote desktop application receiving an indication from the virtual desktop to execute the one application.

9. The non-transitory computer readable medium of claim 8, wherein the first VNIC operates in a kernel space of a guest operating system of the VM.

10. The non-transitory computer readable medium of claim 9, wherein the first VNIC is associated with a first network protocol stack in a user space of the guest operating system making the first VNIC being inaccessible to the one or more other applications.

11. The non-transitory computer readable medium of claim 10, wherein the first network protocol stack is inaccessible to the one or more other applications.

12. The non-transitory computer readable medium of claim 8, wherein the second VNIC operates in a kernel space of a guest operating system of the VM.

13. The non-transitory computer readable medium of claim 12, wherein the second VNIC is associated with a second network protocol stack operating in the kernel space of the guest operating system.

14. The non-transitory computer readable medium of claim 8, wherein the connection between the client machine and the remote desktop application is brokered by a connection broker.

15. A computer system comprising:
a processor; and
a memory comprising system software for the computer system that when executed by the processor perform a method for isolating a connection between a client machine and a remote desktop application, the method comprising:
providing the connection between the client machine and the remote desktop application to exchange remote desktop protocol data by using a first virtual network interface card (VNIC) on a virtual machine (VM),
wherein the VM is configured to execute the remote desktop application and one or more other applications, the remote desktop application providing a virtual desktop to the client machine, and wherein the first VNIC is exclusively accessible by the remote desktop application and inaccessible to the one or more other applications; and
providing another connection between a remote server and one of the one or more other applications using a second VNIC on the VM, in response to the remote desktop application receiving an indication from the virtual desktop to execute the one application.

16. The computer system of claim 15, wherein the first VNIC operates in a kernel space of a guest operating system of the VM.

17. The computer system of claim 16, wherein the first VNIC is associated with a first network protocol stack in a user space of the guest operating system making the first VNIC being inaccessible to the one or more other applications.

18. The computer system of claim 17, wherein the first network protocol stack is inaccessible to the one or more other applications.

19. The computer system of claim 15, wherein the second VNIC operates in a kernel space of a guest operating system of the VM.

20. The computer system of claim 19, wherein the second VNIC is associated with a second network protocol stack operating in the kernel space of the guest operating system.

* * * * *